June 19, 1923.  1,459,487

E. WITZENMANN

FLEXIBLE METAL HOSE

Filed April 29, 1921

Inventor:
Emil Witzenmann,
By [signature]
Atty.

Patented June 19, 1923.

1,459,487

UNITED STATES PATENT OFFICE.

EMIL WITZENMANN, OF PFORZHEIM, GERMANY.

FLEXIBLE METAL HOSE.

Application filed April 29, 1921. Serial No. 465,516.

*To all whom it may concern:*

Be it known that I, EMIL WITZENMANN, a citizen of the Republic of Germany, residing at Pforzheim, Germany, have invented certain new and useful Improvements in Flexible Metal Hose; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

In the manufacture of flexible metal hoses obtained by spiral welding a suitably shaped metallic band made especially of copper alloys and similar alloys the disadvantage presents itself that the flexibility of the hose is materially decreased by the influence of the heat on the walls of the hose caused by the welding process. The walls of the hose become soft and when such a hose is subjected to greater strains a permanent deformation is likely to occur.

This disadvantage is overcome by the present invention. According to it a metallic hose, formed by winding a metal band of a corrugated profile into the shape of a cylindrical spiral and welding the adjacent edges of the windings of the band, is surrounded by a second or outer metallic hose consisting of a similarly wound metal band the profile of which closely corresponds to the profile of the inner welded metallic hose, the joints of the outer hose being closed without welding and preferably by folding. In this manner a hose of double walls is formed the outer shell of which serving to a certain degree as reinforcement to the inner welded hose, whereby the wall of the outer hose remains always elastic as it has not been subjected to any welding process, whereas the inner welded hose serves for tightening the joints of the wall of the outer hose which are only folded.

Hoses manufactured in this manner show the advantages of a welded hose combined with the features of a folded pipe, and the danger of overstraining the hose and causing a permanent deformation is effectively avoided.

The accompanying drawing illustrates two constructional examples of the invention which are partly shown in section.

Figure 1:
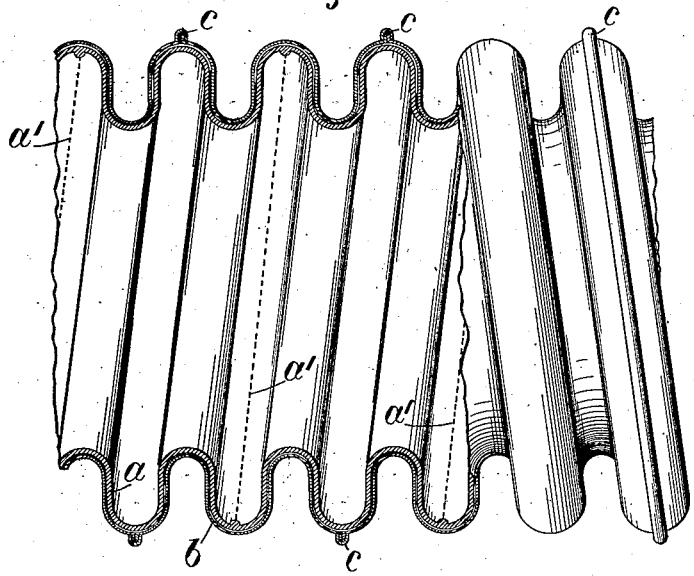

Referring to Fig. 1 of the drawings, $a$ denotes the inner hose formed by winding a metal band of a corrugated cross-section into the shape of a cylindrical spiral and welding the joints electrically or by the autogenous process at $a'$. This hose is surrounded by a second hose $b$ which is likewise formed by winding a metal band of a similar corrugated cross-section into the shape of a circular spiral, the adjacent edges of the windings of the band being however not welded but joined together at $c$ by folding.

The folding may be carried out in any suitable manner, for instance by arranging the edges of the band in the manner of a flange and pressing the two adjacent flanges together by a strip of U-shaped cross-section the shanks of which project over the flanges.

Figure 2:
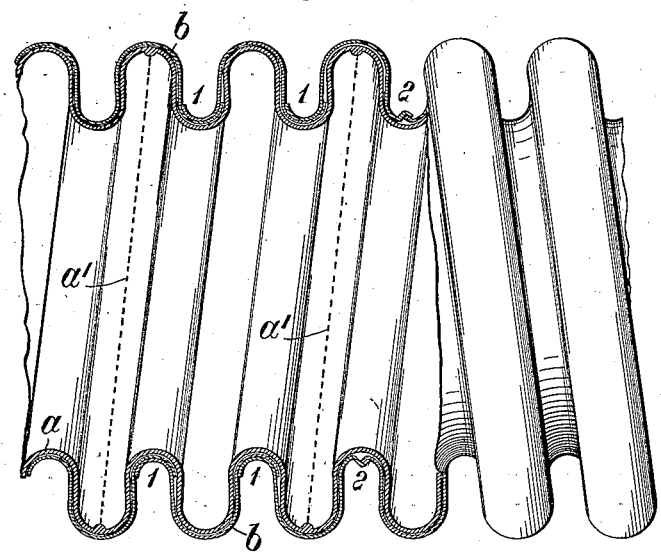

In the constructional example illustrated in Fig. 2 the outer wall of the flexible hose is formed by a tube $b$ provided with swivel joints inasmuch as the adjacent edges of the corrugated metal overlap each other in the concave part of the corrugations as is shown at 1.

Another jointing of the adjacent edges of the windings of the band for forming the outer tube is shown at 2 (Fig. 2), in which one of the edges of the band projects over the bent up part of the other edge of the adjacent winding of the band.

Instead of folding or other jointing of the seams of adjacent bands without making use of welding, the edges could also be brazed together as the heat required for brazing has not any detrimental effect upon the resiliency of the walls of the hose.

I claim:

1. A flexible double-walled metal hose, comprising, in combination, an inner spirally wound metal band of corrugated transverse section having the adjacent edges of its windings united by a welded seam, and an outer spirally wound metal band of corresponding transverse section having the adjacent edges of its windings merely contacting with each other.

2. A flexible double-walled metal hose, comprising in combination, an inner spirally wound metal band of corrugated transverse section having the adjacent edges of its windings united by a welded seam, and an outer spirally wound metal band of corresponding transverse section, the adjacent edges of which overlap one another.

3. A flexible double-walled metal hose, comprising in combination, an inner spirally wound metal band of corrugated transverse section having the adjacent edges of its windings united by a welded seam, and an outer spirally wound metal band of corresponding transverse section having the adjacent edges of its windings merely contacting with each other and lying between the united edges of the inner metal band.

4. A flexible double-walled metal hose, comprising in combination, an inner spirally wound metal band of corrugated transverse section having the adjacent edges of its windings united by a welded seam located at the wave crest, and an outer spirally wound metal band of corresponding transverse section having the adjacent edges of its windings merely contacting with each other and lying in the wave troughs between the united edges of the inner metal band.

5. A flexible double-walled metal hose, comprising, in combination, an inner spirally wound metal band of corrugated transverse section having the adjacent edges of its windings united by a welded seam located at the wave crests, and an outer spirally wound metal band of corresponding transverse section having its adjacent edges overlapping one another and lying in the wave troughs between the united edges of the inner metal band.

In testimony that I claim the foregoing as my invention, I have signed my name.

EMIL WITZENMANN.

Witnesses:
OTTO MEYER KELLER,
ADOLF WITZENMANN.